Jan. 15, 1924.

T. C. WATKINS

TIRE FILLER

Filed July 30, 1921

1,480,580

INVENTOR.
Thomas C. Watkins,
BY
J. Stuart Freeman,
ATTORNEY.

Patented Jan. 15, 1924.

1,480,580

UNITED STATES PATENT OFFICE.

THOMAS C. WATKINS, OF BROOKLAWN, NEW JERSEY, ASSIGNOR TO MASTER TUBELESS TIRE CORPORATION, A CORPORATION OF DELAWARE.

TIRE FILLER.

Application filed July 30, 1921. Serial No. 488,512.

*To all whom it may concern:*

Be it known that I, THOMAS C. WATKINS, a citizen of the United States, residing at Brooklawn, in the county of Camden and State of New Jersey, have invented certain new and useful Improvements in Tire Fillers, of which the following is a specification.

The object of this invention is to provide an improved tire filler, that is a member adapted to be employed in lieu of the usual inner tube within the so-called shoe or casing of a pneumatic tire.

Another object is to provide a member for this purpose, the same being so constructed that by actual tests it functions when operatively mounted upon a vehicle wheel substantially exactly as does the common tire-and-tube construction when inflated by air or other fluid pressure.

A still further object is to provide such a member, comprising a preferably unbroken outer peripheral section adapted to bear uniformly against the inner surface of the road-contacting portion of the tire casing, said section being provided with radially inwardly extending integral projections adapted to bear directly against the outer surface of a wheel rim, or against that portion of the casing which is directly mounted upon a rim.

And a further object is to provide such a construction as that just described, wherein the transverse width of the radial projections is less than the corresponding inside width of the tire casing at varying distances from the center of a wheel upon which a tire casing and the improved filler are mounted.

Figure 1:
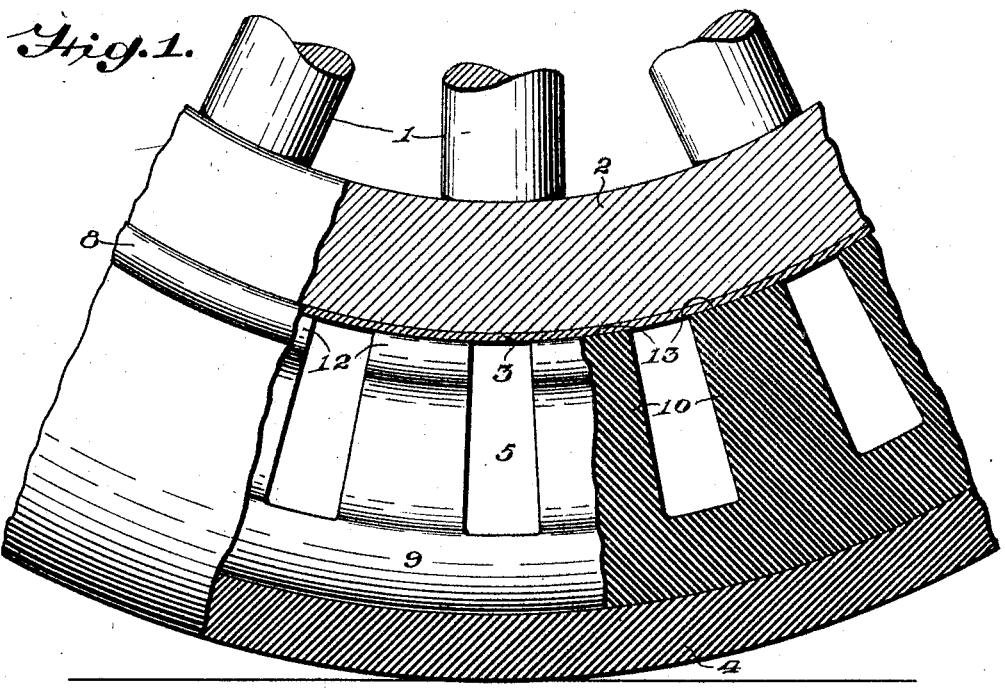
Figure 2:
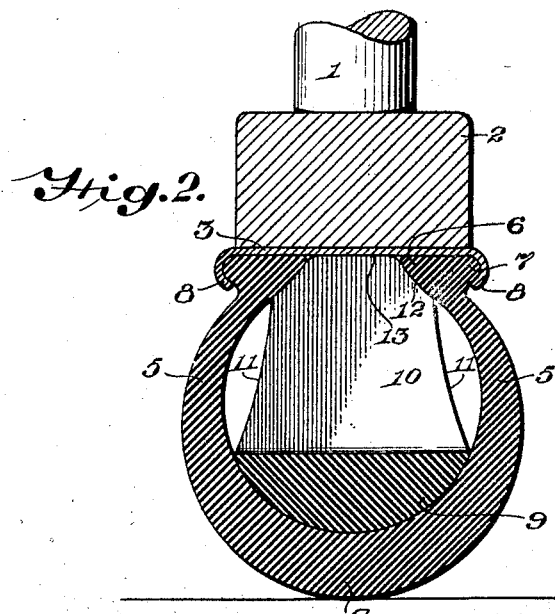

With these and other objects in mind, the invention provides further details of construction and operation as fully brought out in the following description, when read in conjunction with the accompanying drawings, in which Fig. 1 is a fragmentary side elevation of a wheel, tire and filler associated in operative relation and showing the same partly in section, and Fig. 2 is a transverse section on the line 2—2 of Fig. 1.

Referring to the drawings, a portion of a wheel is shown, the same comprising a series of radial spokes 1 upon the outer ends of which is secured a felly 2, to the outer surface of which in turn is secured a suitable rim 3, which for purposes of illustration and simplicity is of the "clincher" type.

A tire casing of any desired form may be used, the one illustrated comprising a radially outer road-contacting section 4, which in opposite directions is curved so as to form a substantially circular cross-section with side walls 5, terminating in similarly shaped transversely tapering sections 6, provided with a beading 7 upon their laterally opposite outer sides for engagement with the clincher flanges 8 of the wheel rim. The adjacent portions of the tapering sections 6 may be either spaced from each other against the wheel rim, or they may be brought closely adjacent to each other.

The preferred embodiment of the invention as shown in the drawings comprises a circumferential preferably unbroken section 9 of flexible resilient material such as certain forms of rubber, this said section being shaped upon its radially outer surface so as to conform closely with the inner surface of the road-contacting section 4 of the tire casing. From said unbroken section there project radially inwardly spaced columns 10, formed integrally with and of the same material as their said supporting section, said columns being transversely concaved at 11, or otherwise so shaped as to space their laterally opposite surfaces from the side walls 5 of the tire casing.

Upon their radially inner ends the said columns are tapered between converging sides 12, which are adapted to bear against the neighboring portions 6 of the casing, while said tapered portion terminates abruptly in a transversely extending surface 13, adapted to bear directly against that portion of the wheel rim exposed between the separated beaded and transversely tapered sections 6 of the said casing. However, for those types of casings in which the beaded portions more closely approach each other, the bearing surface 13 may be partly or entirely eliminated.

When the tire casing and filler therefor are assembled as shown in the drawings, the former is subjected to the wear of travel upon the road, while the latter operates to prevent the said casing from collapsing, thus dispensing entirely with the usual pneumatically inflated inner tube. However, it will be noted that the air between the respectively adjacent pairs of columns is not held stationary and thus prevented entirely from circulating, but on the contrary is readily able to pass from one compartment to another and so on, if necessary completely around the circumference of the tire, and thus preventing the imprisonment of dead or stagnant air within the individual compartments, and tending also to prevent the inclination of the casing and filler to heat up when in use.

Having thus described my invention what I claim and desire to protect by Letters Patent of the United States is:—

1. The combination of a vehicle wheel provided with a rim having oppositely disposed tire-retaining means, with a hollow tire casing carried by said wheel yieldingly between said means and substantially circular in cross-section, and a tire-filler comprising a circumferentially continuous body portion normally bearing uniformly against the inner surface of the road-contacting portion of the said casing, and spaced resilient integral projections extending radially from said body portion and normally bearing against the rim of the wheel, and operative to maintain said body portion and road-contacting portion of said casing in spaced relation from said rim, the laterally opposite sides of said projections being spaced from the adjacent walls of said casing, to permit the free passage of air circumferentially of said casing.

2. A resilient tire-filler, comprising a circumferentially continuous body portion adapted to bear uniformly against the inner surface of the road-contacting portion of a tire casing, and spaced radially inwardly extending columns comprising integral projections of said body portion, having their laterally opposite sides spaced from the inner walls of a surrounding casing, and said body portion being adapted to bear against the rim-engaging portion of a tire casing, to maintain the road-contacting portion of a surrounding tire casing in yielding spaced relation with respect to the tire-supporting rim of a wheel.

3. A tire-filler, comprising a circumferentially continuous body portion adapted to bear against the inner surface of the road-contacting portion of a tire-casing, and spaced radially inwardly extending columns comprising integral projections of said body portion and adapted to maintain the road-contacting portion of a tire casing in yielding spaced relation with respect to the tire-supporting rim of a wheel, said columns being of less width laterally than the distance between the side walls of a surrounding tire casing to permit the free circulation of air circumferentially of the casing.

4. A resilient tire-filler, comprising a circumferentially continuous body portion adapted to bear uniformly against the inner surface of the road-contacting portion of a tire casing, and spaced radially inwardly extending columns comprising integral projections of said body portion and adapted to bear against the rim-engaging portion of a tire casing, to maintain the road-contacting portion of a surrounding tire casing in yielding spaced relation with respect to the tire-supporting rim of a wheel, said columns being of less width laterally than the distance between the side walls of the tire casing.

In testimony whereof I have affixed my signature.

THOMAS C. WATKINS.